(12) United States Patent
Kasuya

(10) Patent No.: US 6,473,566 B2
(45) Date of Patent: Oct. 29, 2002

(54) LENS SYSTEM AND CAMERA SYSTEM COMPOSED OF CAMERA PROVIDED WITH LENS SYSTEM

(75) Inventor: Junichi Kasuya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/920,143

(22) Filed: Aug. 1, 2001

(65) Prior Publication Data

US 2002/0102100 A1 Aug. 1, 2002

(30) Foreign Application Priority Data

Aug. 4, 2000 (JP) ...................................... 2000-237596

(51) Int. Cl.$^7$ ............................................... G03B 5/00
(52) U.S. Cl. .......................................... 396/55; 396/74
(58) Field of Search ............................. 396/55, 73, 74; 348/208; 359/554–557

(56) References Cited

U.S. PATENT DOCUMENTS 6,148,150 A * 11/2000 Yajima et al. ................. 396/55
6,208,810 B1 * 3/2001 Imada .......................... 396/55

* cited by examiner

Primary Examiner—W. B. Perkey
(74) Attorney, Agent, or Firm—Morgan & Finnegan LLP

(57) ABSTRACT

A lens system is provided, which comprising:
 a) an image taking optical unit having an optical axis;
 b) a correction optical component for tilting the optical axis of the image taking optical unit;
 c) a conversion optical component insertable into or retractable from the optical axis of the image taking optical unit;
 d) a vibration sensor for detecting a vibration;
 e) a magnification detection sensor for detecting a conversion magnification of the optical element when the optical element of the conversion optical component is disposed on the optical axis of the image taking optical unit;
 f) a driver for driving the correction optical component to tilt the optical axis of the image taking optical unit; and
 g) a controller for controlling the drive of the correction optical component by the driver in accordance with the detection output from the vibration sensor, characterized in that:
  when the detection output from the vibration sensor exceeds a predetermined limit value, the controller controls the drive of the driver so that the correction optical component is located in the vicinity of the optical axis; and
  the controller changes the limit value in correspondence with the output from the magnification detection sensor.

22 Claims, 7 Drawing Sheets

FIG. 3

|  |  | ZOOM POSITION | | |
|---|---|---|---|---|
| FOCUS POSITION | 0 (CLOSE SIDE END) | 0 (WIDE SIDE END) | ---------- | 0xffff (TELEPHOTO SIDE END) |
|  | 0 (CLOSE SIDE END) | A00 | ---------- | An0 |
|  | ⋮ | ⋮ | ⋮ | ⋮ |
|  | 0xffff (INFINITY SIDE END) | A0n | ---------- | Ann |

FIG. 5

| | | ZOOM POSITION | | |
|---|---|---|---|---|
| FOCUS POSITION | | 0 (WIDE SIDE END) | --------- | 0xffff (TELEPHOTO SIDE END) |
| | 0 (CLOSE SIDE END) | B00 | --------- | Bn0 |
| | ⋮ | ⋮ | | ⋮ |
| | 0xffff (INFINITY SIDE END) | B0n | --------- | Bnn |

LENS SYSTEM AND CAMERA SYSTEM COMPOSED OF CAMERA PROVIDED WITH LENS SYSTEM

BACKGROUND OF THE INVENTION

1. Field of the Invention

The present invention relates to a lens system suitable for film camera, a television camera, a video camera or the like for performing image blur correction caused by vibration or fluctuation due to the hand vibration or wind by using an optical image blur correction optical system such as a shift lens (an image blur correction lens moving in a vertical direction to an image taking optical shaft) that is moved in a direction perpendicular to an optical axis of an image taking optical system or a variable apex angle prism (variable angle prism, VAP) or the like and a camera system composed of a camera provided with the lens system.

2. Related Background Art

In a conventional zoom lens having fluctuation preventing function, an optical image blur correction optical system is controlled so as to correct the vibration or fluctuation such as hand vibration detected by a fluctuation detection means so that the control of the image blur on the image forming plane is performed. In such a fluctuation preventing zoom lens, since the fluctuation or vibration such as hand vibration detected by the fluctuation detection means is corrected irrespective of the intention of the operator, and, the correction is effected for the vibration generated when the lens is moved in the horizontal direction or in the vertical direction, i.e., in so-called panning or tilting so that the operator determines the frame for the image pickup. There is a problem on the image taking operation when the frame is determined by the operator. Therefore, there has been an approach to effect the correction by judging the vibration generated when the operator performs the panning or tilting and the vibration such as hand vibration or the like generated irrespective of the operator's intention. For example, in Japanese Patent Application Laid-open No. 4-86735 (Japanese Patent Application No. 2-201183: U.S. Pat. No. 5,229,603), in an angular shift meter for detecting an angular shift of vibration generated in the camera, the vibration detection characteristics, particularly, the vibration detection frequency band of the angular shift meter are changed in accordance with the angular shift output of the angular shift meter. Namely, the vibration amplitude (angular shift) falls within a predetermined range in case of the normal hand vibration, whereas there is a large angular shift in the operation such as panning, and the judgement as whether the vibration is caused by the intentional operation or not is performed in accordance with the magnitude of the generated angular shift, thereby obtaining the optimum vibration detection characteristics of the sensor, i.e., image blur correction characteristics in accordance therewith.

However, a zoom lens has a focal length converting optical system that is detachable and called an extender separated from the zoom optical system and an angle of view on the image may be largely changed by attachment or detachment of the extender. Namely, in the case where the extender having the conversion magnification ratio of k times is inserted, the view angle after the insertion is 1/k of the view angle before the insertion. In such a case, when the panning is or the like is effected, since the ratio of the vibration, generated by the panning or the like, to the view angle is changed to k times by the insertion of the extender, the movement of the image field could not follow the intention of the cameraman, and there is a problem in that he or she feels something different.

SUMMARY OF THE INVENTION

An object of the present invention is to provide a lens system that may suppress a strange feeling to the cameraman generated due to the difference in conversion ratio of a focal length converting optical system in panning and/or tilting and to provide a camera system provided with the lens system.

In order to attain this and other objects, according to the present invention, there is provided a lens system comprising:

an image taking optical unit having an optical axis;

a correction optical component for tilting the optical axis of the image taking optical unit;

a conversion optical component insertable into or retractable from the optical axis of the image taking optical unit;

a vibration sensor for detecting a vibration;

a insertion or retraction detection sensor for detecting whether the conversion optical component is disposed on the optical axis of the image taking optical unit or not;

a driver for driving the correction optical component to tilt the optical axis of the image taking optical unit; and a controller for controlling the drive of the correction optical component by the driver in response to the detection output from the vibration sensor, characterized in that:

when the detection output from the vibration sensor exceeds a predetermined limit value, the controller controls the drive of the driver so that the correction optical component is located in the vicinity of the optical axis; and the controller changes the limit value in correspondence with the output from the insertion or retraction detection sensor.

Also, according to the present invention, there is provided a lens system comprising:

an image taking optical unit having an optical axis;

a correction optical component for tilting the optical axis of the image taking optical unit;

a shift sensor for detecting a shift amount of the correction optical component;

a conversion optical component insertable into or retractable from the optical axis of the image taking optical unit;

a vibration sensor for detecting a vibration;

a insertion or retraction detection sensor for detecting whether the conversion optical component is disposed on the optical axis of the image taking optical unit or not;

a driver for driving the correction optical component to tilt the optical axis of the image taking optical unit; and a controller for controlling the drive of the correction optical component by the driver in response to the detection output from the vibration sensor, characterized in that:

when the detection output from the shift sensor exceeds a predetermined limit value of the shift amount, the controller controls the drive of the driver so that the correction optical component is located in the vicinity of the optical axis; and the controller changes the limit value in correspondence with the output from the insertion or retraction detection sensor.

Note that other structures and objects of the present invention will be apparent in th e description of the following embodiments.

BRIEF DESCRIPTION OF THE DRAWINGS

FIG. 3 is a data table of correction coefficients with respect to the vibration angle in the yaw direction in accordance with the first embodiment of the present invention;

FIG. 5 is a data table of correction coefficients with respect to the vibration angle in the pitch direction in accordance with the first embodiment of the present invention;

DESCRIPTION OF THE PREFERRED EMBODIMENTS

First Embodiment

Figure 1:
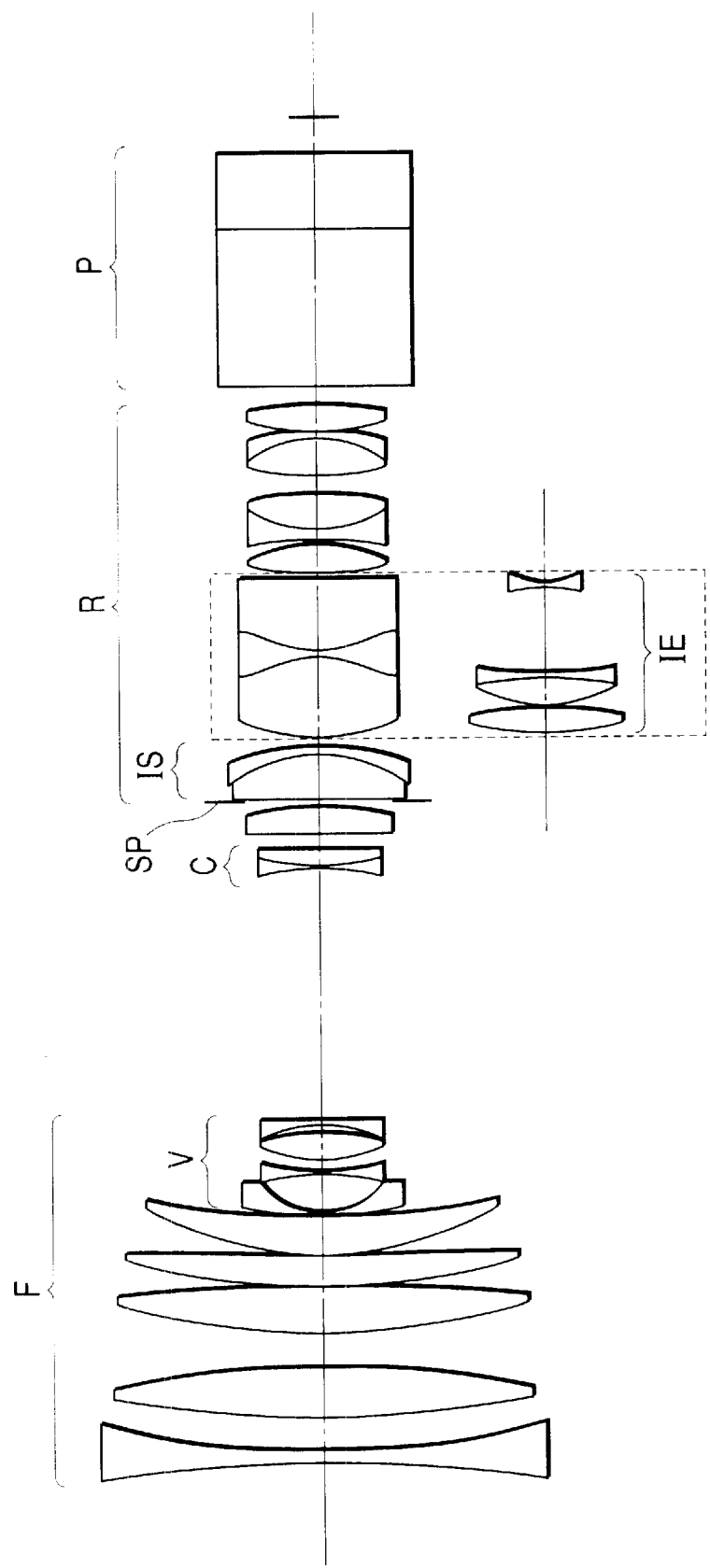
FIG. 1 is a view showing an arrangement of an optical system of a vibration preventing zoom lens system in accordance with a first embodiment of the present invention.

FIG. 1 shows an arrangement of an optical system in accordance with one embodiment of the present invention, that is an example in which a focal length converting optical system (hereinafter, referred to as an extender) IE is located closer to the image side than an image blur correction optical system (correction optical system) IS. F denotes a focus lens group having a negative refractive power as a first lens group. V denotes a variator as a second lens group having a negative refractive power for varying of magnification of lens power (zooming) and moves to the image side along the image taking optical axis so as to perform the zooming from a wind angle end to a telephoto end. C denotes a compensator having a negative refractive power and moves reciprocatingly along the image taking optical axis for compensating for the change of a image plane in accordance with the zooming operation. A zoom optical system is composed of the variator V and the compensator C. SP denotes an aperture stop diaphragm. R denotes a relay lens group having a positive refractive power and fixed. IS denotes an image blur correcting optical system shown as a shift lens moving in a flat plane substantially vertically to the image taking optical axis for compensating the image blur when the overall system is vibrated. IE denotes an extender having extender optical systems different converting magnification ratio (2 times, 1.5 times, 1 time, 0.8 times, or the like). The extender optical systems are exchanged on the image taking optical axis to change the overall focal length to the telephoto side or wide angle side. Incidentally, air, a flat glass, a lens or the like may be used to constitute the focal length converting optical system having one time (extender optical system). In this case, the air means the condition that the extender optical system is retracted away from the image taking optical axis or the condition that the portion of through-hole as the extender optical system is disposed on the image taking optical axis. The image blur correction optical system IS and the extender IE are included in the relay lens group R. P denotes a chromatic decomposition optical system or an optical filter indicated by a glass block in FIG. 1.

In FIG. 1, the image blur correction optical system IS is located closer to the image side than the zoom optical system V and C but it is possible to apply the present invention to the case where the image blur correction system IS is located closer to the object side.

Figure 2:
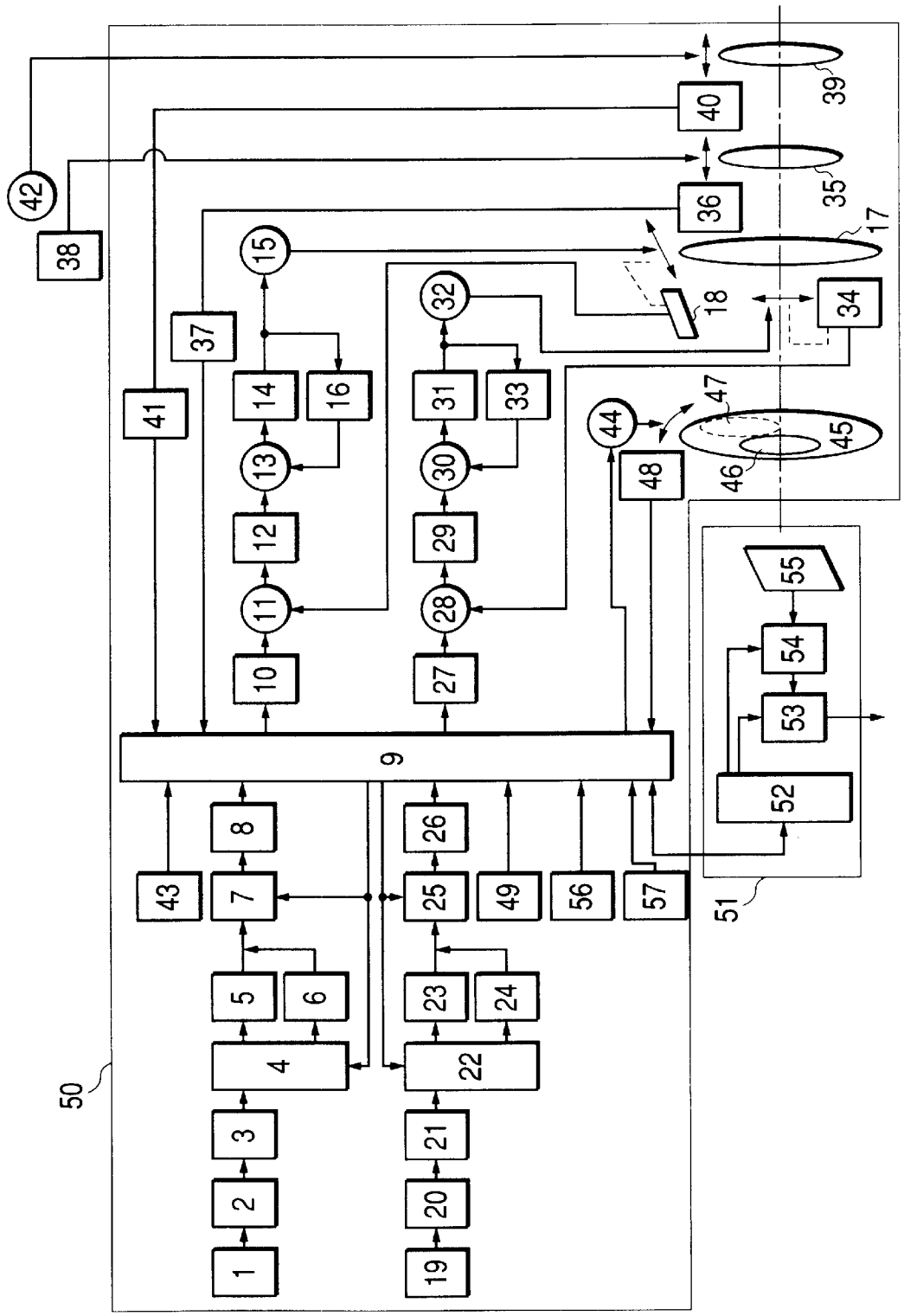
FIG. 2 is a block diagram showing a structure of a camera system in accordance with the first embodiment of the present invention.

FIG. 2 is a block diagram of a camera system suitable for broadcasting, composed of a video camera and the fluctuation preventing zoom lens system according to one embodiment of the present invention.

Explaining the scheme of the system referring to FIG. 2, reference numeral 50 denotes a fluctuation preventing zoom lens system, and numeral 51 denotes a video camera. A microcomputer 9 is provided in the fluctuation preventing zoom lens system 50 and a microcomputer 52 is provided in the video camera 51, respectively. The microcomputer 52 and the microcomputer 9 perform the serial communication to thereby perform the signal exchange between the camera and the lens. Also, the image formed by the fluctuation preventing zoom lens system 50 is focused on a CCD 55 as an image sensor of the video camera 51. The image sensor is not always the CCD. Charges are read out from the CCD 55 in order. The charges pass through an image signal processing circuit 54 and thereafter are outputted to the outside of the system as an image signal through an image output circuit 53.

The internal structure of the fluctuation preventing zoom lens system 50 will now be described. Reference numeral 35 denotes a zoom optical system for zooming, numeral 36 denotes a positional detector for detecting the zoom position of the zoom optical system 35, numeral 37 denotes an A/D converter, and numeral 38 denotes a zoom operating member for operating the zoom optical system 35.

Furthermore, numeral 39 denotes a focusing lens group for focusing, numeral 40 denotes a positional detector for detecting the focus position of the focusing lens group 39, numeral 41 denotes an A/D converter, and numeral 42 denotes a focus operating member for operating the focusing lens group 39. With such an arrangement, the operator operates the zoom operating member 38 so that the zoom optical system 35 moves along the image taking optical axis to make it possible to perform the zooming operation. The zoom position of the zoom optical system 35 is detected by means of the position detector 36 to always output the zoom position signal. This outputted zoom position signal is converted into a digital signal by the A/D converter 37 and inputted into the microcomputer 9. In the same manner, the operator operates the focus operating member 42 so that the focus lens group 39 moves along the image taking optical axis to thereby make it possible to perform the focusing operation. The focus position of the focus lens group 39 is detected by means of the position detector 40 to always output a focus position signal. This outputted focus position signal is converted into a digital signal by means of the A/D converter 41 and inputted into the microcomputer 9.

The extender is disposed in the fluctuation preventing zoom lens system 50. Numeral 43 denotes an extender changeover switch, numeral 44 denotes a motor for switching the attachment or detachment of the extender, numeral 45 denotes an extender holder member for holding the extender, numeral 46 denotes a first extender having a converting magnification ratio of one time (1×), and numeral 47 denotes a second extender having a converting magnification ratio of two times (2×). Numeral 48 denotes a position detector for detecting the extender. The extender changeover switch 43 outputs an extender switching signal corresponding to the extender 46 or 47 to be inserted into the image taking optical axis and the signal is inputted into the microcomputer 9. In the microcomputer 9, the motor 44 is driven in accordance with the extender switching signal to rotate the extender holder member 45 and at the same time supervises the positional signal of the extender outputted from the position detector 48 to move the extender 46 or 47 selected by the extender switch 43 into the position on the image taking optical axis to thereby perform the exchange of the extenders.

The structure related to the image blur correction will now be described. Numeral 1 denotes a yaw angular velocity sensor for detecting a horizontal vibration of the fluctuation preventing zoom lens system 50, numeral 2 denotes a high pass filter for separating only a high frequency component out of a signal inputted, numeral 3 denotes a low pass filter for separating a low frequency component out of the signal inputted, numeral 4 denotes an analog switch (signal switcher) for perform the exchange of signals, numeral 5 and 6 high pass filters, 7 denotes an integrator, numeral 8 denotes an A/D converter for converting the analog signal into a digital signal, numeral 9 denotes a microcomputer for calculating the output signal and processing the input signal, numeral 10 denotes a D/A converter for converting the digital signal into an analog signal, numeral 11 denotes a subtractor for subtracting the analog signal, numeral 12 denotes a phase compensation circuit for compensating the phase of a frequency component of the analog signal inputted, numeral 13 denotes a subtractor, numeral 14 denotes an amplifier circuit for amplifying an electric power of the inputted signal, numeral 15 denotes a motor for driving horizontally the image blur correction optical system for compensating for the image blur in the yaw direction, numeral 16 denotes a current detection circuit for detecting a magnitude of the current to be fed to the motor 15, numeral 17 denotes the image blur correcting optical system for correcting a tilt of the image taking optical axis, and numeral 18 denotes a position detector for detecting the horizontal position of the image blur correcting optical system 17. The components from the yaw angular velocity sensor 1 to the position detector 18 constitute a servo system for performing the horizontal control of the image blur correcting optical system 17.

In the same manner, numeral 19 denotes a pitch angular velocity sensor for detecting an angular velocity of a vertical vibration of the fluctuation preventing zoom lens system 50, numeral 20 denotes a high pass filter for separating only a high frequency component out of a signal inputted, numeral 21 denotes a low pass filter for separating a low frequency component out of the signal inputted, numeral 22 denotes an analog switch (signal switcher) for perform the exchange of signals, numeral 23 and 24 denote high pass filters, 25 denotes an integrator, numeral 26 denotes an A/D converter for converting the analog signal into a digital signal, numeral 27 denotes a D/A converter for converting the digital signal into an analog signal, numeral 28 denotes a subtractor for subtracting the analog signal, numeral 29 denotes a phase compensation circuit for compensating the phase of a frequency component of the analog signal inputted, numeral 30 denotes a subtractor, numeral 31 denotes an amplifier circuit for amplifying an electric power of the inputted signal, numeral 32 denotes a motor for driving vertically the image blur correction optical system 17 for compensating for the image blur in the pitch direction, numeral 33 denotes a current detection circuit for detecting a magnitude of the current to be fed to the motor 32, and numeral 34 denotes a position detector for detecting the vertical position of the image blur correcting optical system 17. The components from the pitch angular velocity sensor 19 to the position detector 34 constitute a servo system for performing the vertical control of the image blur correcting optical system 17.

Also, numeral 49 denotes a fluctuation preventing selection switch for allowance or prohibition of the image blur correction in the yaw direction and the pitch direction. This switch is operated so that the prohibition of the correction of the image blur correction in the yaw direction or the correction of the image blur correction in the pitch direction may be selected. Numeral 56 denotes a limit value stay limit time input member for inputting a limit value stay limit time for judging the panning or the tilting to be described later. Numeral 57 denotes a centering time input member for inputting a period of time for returning the correction optical system 17 back to the standard position in the vicinity of and including the image taking optical axis (a predetermined centering position and the position when the angular shift position that is the output of the integrators 7 and 25 is at zero.) in the punning operation or the tilting operation.

The operation of the servo system in the yaw direction composed of the components from the yaw angular velocity sensor 1 to the position detector 18 will first be described referring to FIG. 2. The vibration signal in the yaw direction detected by the yaw angular velocity sensor 1 passes through the high pass filter 2 so that the signal component of the low frequency such as a swing is removed and further passes through the low pass filter 3 to become the signal that is free from the adverse affect such as noise in the left signal component. It is therefore possible to pick up the signal component having a necessary band. The picked-up signal passes through the analog switch 4 controlled by the microcomputer 9 to be outputted to either high pass filter 5 or 6. The high pass filters 5 and 6 are the high pass filters having the different frequency bands. The filter 5 and the filter 6 are the high pass filters having the necessary bands for the normal control and the special control such as the case where the operation is judged as the panning condition or the like to be described later, respectively. The microcomputer 9 switches over the analog switch 4 so that the high pass filter having the necessary band may be suitably selected to obtain the band needed for the control. The signal outputted from the high pass filter 5 or 6 is inputted into the integrator 7. The integrator 7 integrates the yaw angular velocity signal to output an angular signal representative of the magnitude of the shift angle in the yaw direction. The outputted angular signal is converted into a digital signal through the A/D converter 8 and inputted into the microcomputer 9.

In the microcomputer 9, if the output of the fluctuation preventing selection switch 49 allows the image blur correction in the yaw direction, the command value in the yaw direction of the image blur correction optical system 17 is calculated and outputted to the D/A converter 10 where the command value in the yaw direction outputted as a digital signal is converted into the analog signal and outputted into the subtractor 11. In the latter, the difference between the command value in the yaw direction outputted from the D/A converter 10 and the actual position in the yaw direction of the image blur correcting optical system 17 outputted from the position detector 18 is calculated b the subtractor 11 and the error in the position in the yaw direction is outputted. The amount of the outputted error in the position in the yaw direction is subjected to the phase compensation so as to be controllable in the frequency band in the yaw direction needed in controlling in the phase compensation circuit 12 and thereafter is outputted to the subtractor circuit 13 where the subtraction is effected between this phase compensated signal and the output signal of the current detector circuit 16 for detecting the current to be fed to the motor 15 for driving in the yaw direction and the difference therebetween is outputted to the amplifier circuit 14. The amplifier circuit 14 performs the electric power amplification while using the inputted signal to drive the motor 15 for driving in the yaw direction of the image blur correcting optical system 17. In the yaw direction driving motor 15 drives the image blur correcting optical system 17 in the yaw direction in accordance with the inputted signal. Thus, in the servo system composed of the components from the yaw angular velocity sensor 1 to the position detector 18, the fluctuation in the yaw direction is detected, and the position command value of the image blur correcting optical system 17 needed in correcting the detected vibration signal in the yaw direction is calculated by the microcomputer 9 to form position controlling feedback loop circuit for driving the image blur correcting optical system 17 in the yaw direction in accordance with this positional command value.

The operation of the microcomputer 9 will now be described. In the microcomputer 9, the amount of movement (the amount of correction) in the yaw direction of the image blur correcting optical system 17 is calculated in accordance with a data table calculated in advance by using as parameters the yaw angle signal inputted, the zoom position signal of the zoom optical system 35 for zooming and the focus position signal of the focus lens group 39 that is an optical system for focusing. This data table is shown in FIG. 3. With respect to the correction coefficients A00 to A0n in FIG. 3, the maximum image shift amount ΔYMAX at a certain zoom ratio Z is determined to meet the following relationship:

$$0.8 \leq (Z/ZT)/(\Delta YMAXT/\Delta YMAX) \leq 1.2 \tag{1}$$

where ΔYMAX is the maximum image shift amount which is capable of being corrected by the image blur correcting optical system 17, ZT is the magnification ratio of the zoom lens optical system 35 at the telephoto side end and ΔYMAXT is the maximum image shift amount at the telephoto side end. Thus, it is possible to keep substantially constant the maximum fluctuation angle which is capable of being corrected by the image blur correcting optical system 17. In FIG. 3, the correction coefficients of the image blur correcting optical system 17 for the fluctuation angle (angle signal) in the yaw direction are represented as Axx (x=0, 1, 2, . . . , n). The data table of FIG. 3 is composed of the correcting coefficients Axx corresponding to the zoom positions and the focus positions. In this case, in the zoom positions, the values from the position detector 36 are normalized, the value at the wide side end is represented by zero and the value at the telephoto side end is represented by a 16-notation system as 0xffff. In the focus position, the focus position from the position detector 40 are normalized, the value at the close side end is represented by zero and the value at the infinite side end is represented by a 16-notation system as 0xffff.

In the microcomputer 9, the above-described data table is used and the inputted angle signal in the yaw direction is multiplied by the correction coefficient of the data table to thereby calculate the correction amount of the image blur correcting optical system 17 and output the data to the D/A converter 10 as the position command value of the image blur correcting optical system 17.

Herein, the limit value of the detection signal (angle signal) of vibration for shifting the image blur correcting optical system 17 to the standard position in the vicinity of and including the image taking optical axis will now be described.

When the vibration angle of the image taking optical system is represented by θ and the focal length of the zoom optical system is represented by f, the image shift amount ΔY for the infinite object is:

$$\Delta Y = f \cdot \tan\theta \tag{2}$$

Then, the maximum image shift amount YMAX which is capable of being corrected by the image blur correcting optical system 17 is:

$$\Delta YMAX = f \cdot \tan\theta MAX \tag{3}$$

Where θMAX is the image blur correctable maximum vibration angle.

Also, when the focal length converting optical system (extender) having the conversion ratio of k times is inserted into the image taking optical axis, the maximum image shift amount is represented by:

$$\Delta YMAX = k \cdot f \cdot \tan\theta MAX \tag{4}$$

In the equation (3), the maximum vibration angle θ MAX determined by imparting the maximum image shift amount ΔYMAX at the telephoto side end at the conversion ratio of one time so that the maximum image shift amount ΔYMAX is changed depending upon the focal length f from the equation (3). It is necessary to keep the maximum image shift amount ΔYMAX unchanged even if the focal length converting optical system is inserted because the cameraman does not feel something different. In this case, in the equation (4), the maximum vibration angle θMAX determined by imparting the same value in the above-described case at the ratio of one time as the maximum image shift amount ΔYMAX at the telephoto side end at the conversion ratio of k times is kept constant so that the maximum image shift amount ΔYMAX is changed depending upon the focal length f from the equation (4).

According to the present invention, the limit value corresponding the maximum vibration angle θMAX within which the image blur may be corrected as the judging level for judging the panning, tilting or the like is set, and this limit value is changed in correspondence with the conversion ratio k of the focal length converting optical system to be inserted into the image taking optical axis.

The above-described change in the limit value may be obtained by the calculation of the computer 9 every time, or the limit value data table provided by limit values determined in advance may be stored as the data table in the internal memory of the computer 9 or the memory provided outside for obtaining the limit value.

Incidentally, in the foregoing embodiment, the case where the panning and the tilting may be judged from the angle signal has been described. However, it is possible to judge the panning and tilting from the shift amount ΔS of the image blur correcting optical system.

The shift amount ΔS of the image blur correcting system for off-setting the image shift amount ΔY is represented by the following equation:

$$\Delta S = -\Delta Y/dy \quad (5)$$

where dy is the image shift sensitivity of the image blur correcting optical system. However, in the case where the image blur correcting optical system is located closer to the image side than the zoom optical system V, C, the image shift sensitivity dy is kept constant, and in the case where image blur correcting optical system is located closer to the object side, the image shift sensitivity is not kept constant but may change depending upon the condition of the optical system disposed closer to the image side than the image blur correcting optical system.

According, from the above-described equations (3) and (4), the maximum shift amount ΔSMAX of the image blur correcting optical system is:

$$\Delta SMAX = -\Delta YMAX/dy = -f \cdot \tan\theta MAX/dy \quad (6)$$

$$\Delta SMAX = -\Delta YMAX/dy = -k \cdot f \cdot \tan\theta MAX/dy \quad (7)$$

Therefore, in order to judge the panning, tilting from the shift amount ΔS of the image blur correcting optical system, it is sufficient to set the value of the limit change amount corresponding to the maximum shift amount ΔSMAX of the image blur correcting optical system, and at the same time, to change the value of this limit change amount in correspondence with the image shift sensitivity dy from the focal length f (i.e., the zoom position of the zoom optical system) and the conversion ratio k of the focal length converting optical system to be inserted into the image taking optical axis.

The above-described limit value change may be obtained by the calculation of the computer 9 every time, or may be obtained by using the data table of these limit change amount values while the predetermined limit change amount values are stored in the internal memory or the outside memory.

If the angular signal in the yaw direction inputted through the A/D converter 8 is located in the position beyond the limit value for the longer period of limit time inputted from the limit value stay limit time input member 56, the microcomputer 9 judges that the panning is performed and shifts to the panning operation controlling mode upon the judgement of the panning. Namely, the analog switch 4 is switched over, and the signal is switched over so that the output of the low pas filter 3 is inputted into the high pass filter 6 for the panning operation. Since the high pass filter 6 has a high interrupt frequency in comparison with that of the high pass filter 5 and the interrupt frequency is set so that the input signal is gradually attenuated, the output signal of the high pass filter 6 is a signal of zero representative of the condition of the no vibration. Also, at the same time, the microcomputer 9 outputs the signal to the integrator 7 to change of the integrating time constant and to discharge. The integrator 7 is controlled to be returned back to the reference condition with the zero output in accordance with this signal, as a result of which the angular signal in the yaw direction outputted from the integrator 7 is returned back to the reference condition, i.e., attenuated to zero. Incidentally, the integration time constant in this case is changed to thereby make it possible to control the period of time for returning back to the reference condition. In the microcomputer 9, since under the condition that the inputted angular signal in the yaw direction is at zero, the correction amount of the image blur correcting optical system 17 is at zero, i.e., under the condition that is equal to the condition that the compensation is not effected, the image blur correcting optical system 17 is moved to the reference position (centering position) where the correction amount is at zero. When the microcomputer 9 judges that the output of the A/D converter 8 is under the reference condition, the analog switch 4 is again switched over. The microcomputer 9 inputs the signal to the high pass filter 5 and at the same time interrupts the signal output to the integrator 7 for the normal operation.

Furthermore, in the case where the extender having the conversion ratio k is inserted, the limit value for the angular signal in the yaw direction corresponding to the conversion ratio k is set. For instance, the limit value Is set at 1/k and the judgement is performed in comparison with the case of the conversion ratio of one time so that the mode is shifted to the panning operation controlling mode at a smaller vibration angle in comparison with, for example, the case where the extender 46 (conversion ratio 1×) is inserted.

Incidentally, in the case where the operational mode is switched to the condition that no extender is provided (i.e., the conversion ratio of one time) and the condition that the extender having the conversion ratio k is inserted, the presence/absence of the extender is detected. When the presence is detected, it is possible to set the limit value to a small value, for example, 1/k.

Thus, the limit value of the vibration for shifting the panning operation control mode is changed in accordance with a kind (conversion ratio) of the extender, the change of the correctable vibration on the image generated by the attachment or detachment of the extender is obviated so that the image blur correction is possible without any unusual feeling due to the difference in size of the correctable vibration.

Figure 4:
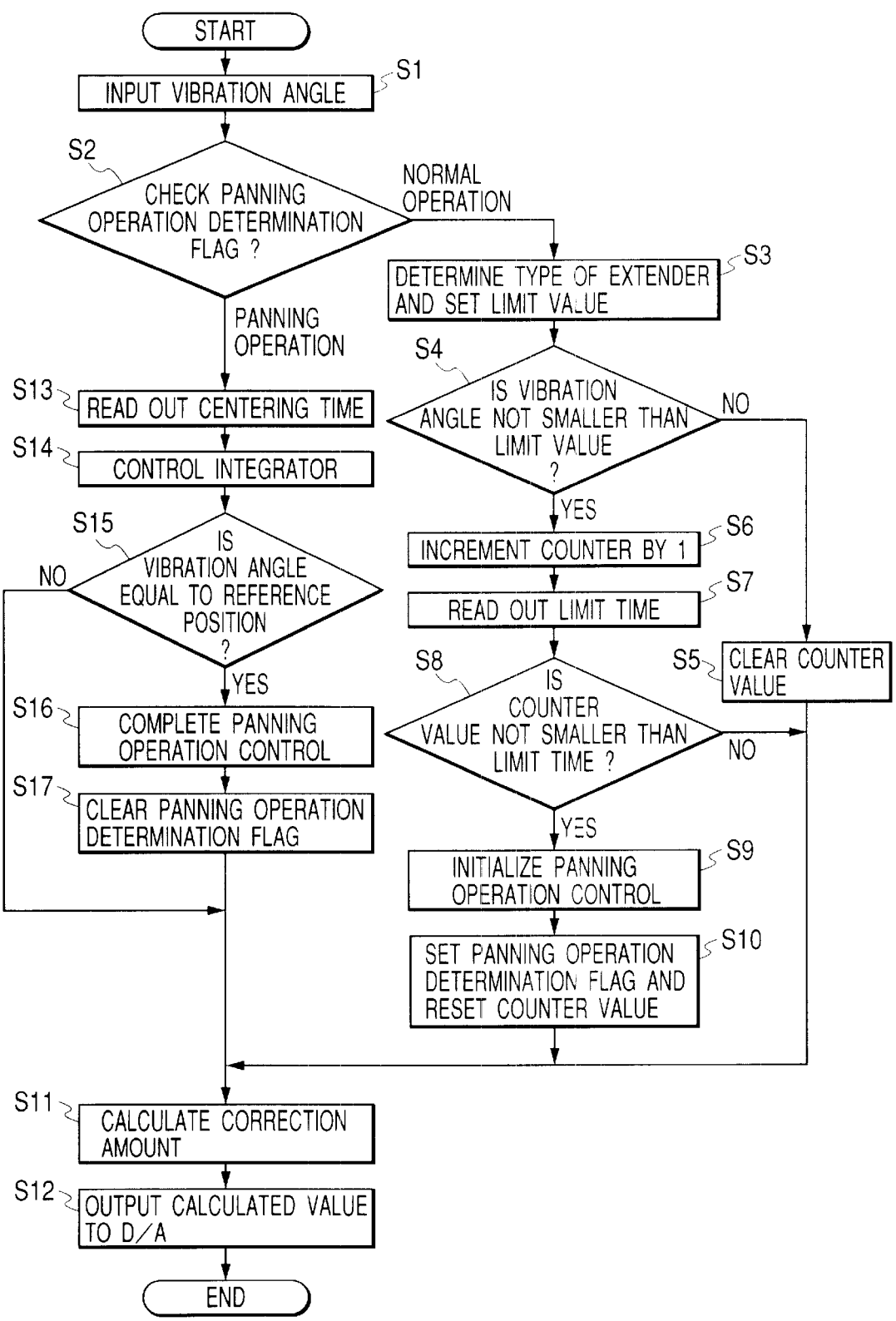
FIG. 4 is a flowchart showing the operation control in the yaw direction in accordance with the first embodiment of the present invention.

The operation of the above-described microcomputer 9 is represented by the flowchart of FIG. 4. The microcomputer 9 performs the process shown in this flowchart for a constant period of time. In the vibration angle input process in the first step S1, the data into which the outputs of the integrator 7 are converted by the A/D converter 8 are inputted. In step S2, the determination is performed by means of a flag as to whether the panning operation control is performed or the normal operation control is performed. The operation goes to the respective control steps. In the normal operation, in step S3, the position of the extender is picked up, the kind (conversion magnification) of the extender currently inserted into the image taking optical axis is determined, and the limit value of the vibration angle for shifting to the panning operation control is set to a predetermined value in accordance with the kind of the extender. In step S4, the magnitude of the vibration angle inputted at step S1 and the limit value of the vibration angle set in step S3 are compared with each other. If the vibration angle is smaller than the limit value, since it is unnecessary to shift the operational mode to the panning operation control, the counter (since the operation in the flowchart shown in FIG. 4 is periodically performed at a constant interval, the number of the cycles of the flowchart is counted by the counter to measure the period of time) representative the period of time for staying at the limit value of the vibration angle is cleared. Thereafter, in step 11, the data table is used to calculate the correction amount from the inputted vibration angle. The result calculated in the step S12 is outputted to the D/A converter 10.

On the other hand, in step S4, in the case where the vibration angle exceeds the limit value, the operational mode goes to the step S6 and the counter representative of the period of time for which the vibration angle stays beyond the limit value is incremented by +1. Furthermore, the limit time inputted by the limit value stay limit time input member 57 is read out in step S7. In step S8, the set limit time and the counter value are compared with each other. If the counter value does not reach the limit time, at the present it is determined that it is unnecessary to shift the operational mode to the panning operation control. The correction amount is calculated from the input vibration angle in step S11. The result calculated in the step S12 is outputted to the D/A converter 10. In the case where it is judged that the counter value exceeds the limit time is step S8, in step S9, the panning operation control is initialized. Namely, since the operational mode shifts to the panning operation control, the output of the analog switch 4 is switched to the high pass filter 6, and at the same time, the control is effected so that the output of the integrator 7 comes to the reference condition. In step S10, after the flag for determination of the performance of the panning operation control is set and the counter representative of the time for which the vibration angle stays beyond the limit value is cleared. After that, the next operational control goes to the step S11 where the correction amount is calculated from the inputted vibration angle. The result calculated in the step S12 is outputted to the D/A converter 10. The above-described consecutive steps are the flowchart for the normal operational control.

The operational control flowchart of the panning operation will now be described. In the step S13 subsequent to the flowchart branched from the banning operation in accordance with the banning operation determination flag, a time period for centering is set in accordance with the input from the centering time input member 57. In step S14, the control of the integrator 7 is performed using the period of time for centering as a parameter. Namely, the integrator 7 is controlled so that the output becomes the reference condition, as a result of which the angle signal in the yaw direction outputted from the integrator 7 is attenuated to the reference condition, i.e., zero. In the next step S15, the input vibration angle and the reference position (centering position) are compared with each other. If the input vibration angle reaches the reference position, in step S16, in order to finish the panning operation control, the output of the analog switch 4 is switched to the high pass filter 5. Furthermore, the control of the integrator 7 is finished, and in step S17, the panning operation determination flag is cleared up. Then, the correction amount is calculated from the input vibration angle in step S11. The result calculated in step S12 is outputted to the D/A converter 10. Unless the input vibration angle reaches the reference position, in order to continue the panning operation control in the next cycle, the operation goes from the step S15 to step S11 so that the panning operation determination flag is not cleared up. The correction amount is calculated from the input vibration angle. The result calculated in step S12 is outputted to the D/A converter 10. The control flowchart in the case where the blur image correction in the yaw direction is allowed has been described above.

The like system is formed in the pitch direction. Namely, the vibration signal in the pitch direction detected by the pitch angular velocity sensor 19 passes through the high pass filter 20 so that the signal component of the low frequency such as a swing is removed and further passes through the low pass filter 21 to become the signal that is free from the adverse affect such as noise in the left signal component. It is therefore possible to pick up the signal component having a necessary band. The picked-up signal passes through the analog switch 22 controlled by the microcomputer 9 to be outputted to either high pass filter 23 or 24. The high pass filters 23 and 24 are the filters having the different frequency bands. The filter 23 and the filter 24 are the high pass filters having the necessary bands for the normal control and the special control such as the case where the operation is judged as the tilting condition or the like respectively, similar to the case of the panning condition described above. The microcomputer 9 switches over the analog switch 22 so that the high pass filter having the necessary band may be suitably selected to obtain the band needed for the control. The signal outputted from the high pass filter 23 or 24 is inputted into the integrator 25. The integrator 25 integrates the pitch angular velocity signal to output an angular signal representative of the magnitude of the shift angle in the pitch direction. The outputted angular signal is converted into a digital signal through the A/D converter 26 and inputted into the microcomputer 9.

In the microcomputer 9, if the output of the fluctuation preventing selection switch 49 allows the image blur correction in the pitch direction, the command value in the pitch direction of the image blur correction optical system 17 is calculated and outputted to the D/A converter 27 where the command value in the pitch direction outputted as a digital signal is converted into the analog signal and outputted into the subtractor 28. In the latter, the difference between the command value in the pitch direction outputted from the D/A converter 27 and the actual position in the pitch direction of the image blur correcting optical system 17 outputted from the position detector 34 is calculated by the subtractor 28 and the error in the position in the pitch direction is outputted. The amount of the outputted error in the position in the pitch direction is subjected to the phase compensation so as to be controllable in the frequency band in the pitch direction needed in controlling in the phase compensation circuit 29 and thereafter is outputted to the subtractor circuit 30 where the subtraction is effected between this phase compensated signal and the output signal of the current detector circuit 33 for detecting the current to be fed to the motor 32 for driving in the pitch direction and the difference therebetween is outputted to the amplifier circuit 31. The amplifier circuit 31 performs the electric power amplification while using the inputted signal to drive the motor 32 for driving in the pitch direction of the image blur correcting optical system 17 and amplified signal is input into the motor 32. In the pitch direction driving motor 32 drives the image blur correcting optical system 17 in the pitch direction in accordance with the inputted signal. Thus, in the servo system composed of the components from the pitch angular velocity sensor 19 to the position detector 34, the fluctuation in the pitch direction is detected, and the position command value of the image blur correcting optical system 17 needed in correcting the detected vibration signal in the pitch direction is calculated by the microcomputer 9 to form position controlling feedback loop circuit for driving the image blur correcting optical system 17 in the pitch direction in accordance with this positional command value.

In the same manner as in the case in the yaw direction, the operation of the microcomputer 9 will now be described. In the microcomputer 9, the amount of movement (the amount of correction) also in the pitch direction of the image blur correcting optical system 17 is calculated in accordance with a data table calculated in advance as shown in FIG. 5 by using as parameters the pitch angle signal inputted, the zoom position signal of the zoom optical system 35 for zooming and the focus position signal of the focus lens group 39 that is an optical system for focusing. The data table of FIG. 5 is calculated in the same manner as in the yaw direction. The maximum vibration angle in the pitch direction correctable by the image blur correcting optical system 17 is kept substantially constant. In FIG. 5, the correction coefficients of the image blur correcting optical system 17 for the fluctuation angle in the pitch direction are represented as Bxx (x=0, 1, 2, ..., n). The data table of FIG. 5 is composed of the correcting coefficients Bxx corresponding to the zoom positions and the focus positions. In this case, in the zoom positions, the values from the position detector 36 are normalized, the value at the wide side end is represented by zero and the value at the telephoto side end is represented by a 16-notation system as 0xffff. In the focus position, the focus position from the position detector 40 are normalized, the value at the close side end is represented by zero and the value at the infinite side end is represented by a 16-notation system as 0xffff.

In the microcomputer 9, the above-described data table is used and the correction amount of the image blur correcting optical system 17 is calculated from the inputted angle signal in the pitch direction and outputted to the D/A converter 27 as the position command value of the image blur correcting optical system 17.

Also, if the angular signal in the pitch direction inputted through the A/D converter 26 is located in the position beyond the limit value for the longer period of limit time inputted from the limit value stay limit time input member 56, the microcomputer 9 judges that the tilting is performed and shifts to the tilting operation controlling mode upon the judgement of the tilting. Namely, the analog switch 22 is switched over, and the signal is switched over so that the output of the low pas filter 21 is inputted into the high pass filter 23 for the tilting operation. Since the high pass filter 24 has a high interrupt frequency in comparison with that of the high pass filter 23 and the interrupt frequency is set so that the input signal is gradually attenuated, the output signal of the high pass filter 24 is a signal of zero representative of the condition of the no vibration. Also, at the same time, the microcomputer 9 outputs the signal to the integrator 25 to change of the integrating time constant and to discharge. The integrator 25 is controlled to be returned back to the reference condition with the zero output in accordance with this signal, as a result of which the angular signal in the pitch direction outputted from the integrator 25 is returned back to the reference condition, i.e., attenuated to zero. Incidentally, the integration time constant in this case is changed to thereby make it possible to control the period of time for returning back to the reference condition. In the microcomputer 9, since under the condition that the inputted angular signal in the pitch direction is at zero, the correction amount of the image blur correcting optical system 17 is at zero, i.e., under the condition that is equal to the condition that the compensation is not effected, the image blur correcting optical system 17 is moved to the reference position (centering position) where the correction amount is at zero. When the microcomputer 9 judges that the output of the A/D converter 26 is under the reference condition, the analog switch 22 is again switched over. The microcomputer 9 inputs the signal to the high pass filter 23 and at the same time interrupts the signal output to the integrator 25 for the normal operation.

Furthermore, in the case where the extender having the conversion ratio k is inserted, the limit value for the angular signal in the pitch direction corresponding to the conversion ratio k is set. For instance, the limit value is set at 1/k and the judgement is performed in comparison with the case of the conversion ratio of one time so that the mode is shifted to the tilting operation controlling mode at a smaller vibration angle in comparison with, for example, the case where the extender 46 (conversion ratio 1x) is inserted.

Thus, the limit value of the vibration for shifting to the tilting operation control mode is changed in accordance with a kind (conversion ratio) of the extender, whereby the change of the correctable vibration on the image generated by the attachment or detachment of the extender is obviated so that the image blur correction is possible without any unusual feeling on the image due to the difference in size of the correctable vibration.

Figure 6:
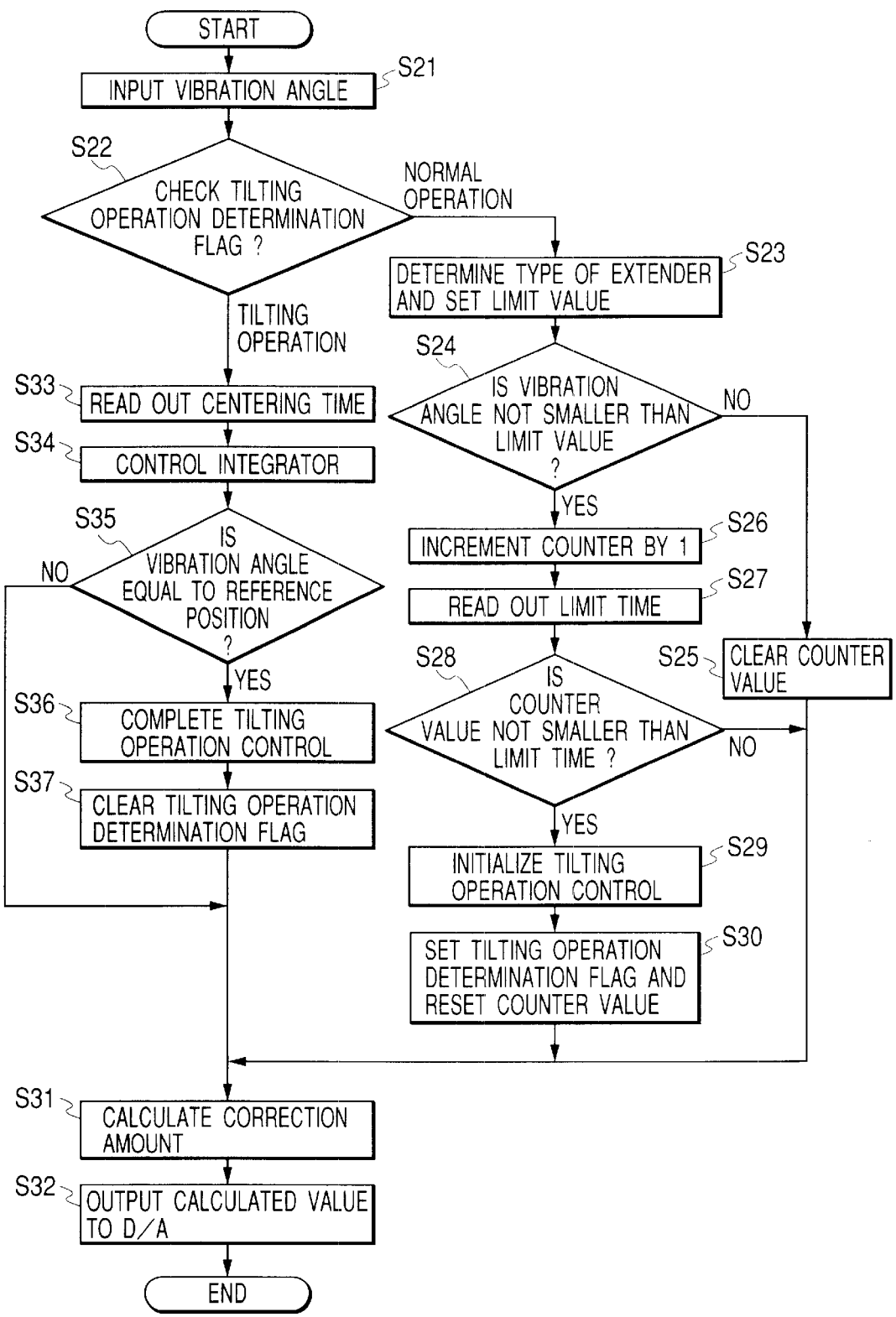
FIG. 6 is a flowchart showing the operation control in the pitch direction in accordance with the first embodiment of the present invention.

The operation of the above-described microcomputer 9 is represented by the flowchart of FIG. 6. The microcomputer 9 performs the process shown in this flowchart for a constant period of time. In the vibration angle input process in the first step S21, the data into which the outputs of the integrator 25 are converted by the A/D converter 26 are inputted. In step S22, the determination is performed by means of a flag as to whether the tilting operation control is performed or the normal operation control is performed. The operation goes to the respective control steps. In the normal operation, in step S23, the position of the extender is picked up, the kind (conversion magnification) of the extender currently inserted into the image taking optical axis is determined, and the limit value of the vibration angle for shifting to the tilting operation control is set to a predetermined value in accordance with the kind of the extender. In step S24, the magnitude of the vibration angle inputted in step 21 and the limit value of the vibration angle set in step S23 are compared with each other. If the vibration angle is smaller than the limit value, since it is unnecessary to shift the operational mode to the tilting operation control, the counter (since the operation in the flowchart shown in FIG. 6 is periodically performed at a constant interval, the number of the cycles of the flowchart is counted by the counter to measure the period of time) representative the period of time for staying of the vibration angle at the limit value is cleared. Thereafter, in step 31, the data table is used to calculate the correction amount from the inputted vibration angle. The result calculated in step S32 is outputted to the D/A converter 27.

On the other hand, in step S24, in the case where the vibration angle exceeds the limit value, the operation goes to the step S26 and the counter representative of the period of time for which the vibration angle stays beyond the limit value is incremented by +1. Furthermore, the limit time inputted by the limit value stay limit time input member 57 is read out in step S27. In step S28, the set limit time and the counter value are compared with each other. If the counter value does not reach the limit time, at the present it is determined that it is unnecessary to shift the operational mode to the tilting operation control. The correction amount is calculated from the input vibration angle in step S31. The result calculated in the step S32 is outputted to the D/A converter 27. In the case where it is judged that the counter value exceeds the limit time in step S28, in step S29, the tilting operation control is initialized. Namely, since the operational mode shifts to the tilting operation control, the output of the analog switch 22 is switched to the high pass filter 24, and at the same time, the control is effected so that the output of the integrator 25 comes to the reference condition. In step S30, after the flag for determination of the performance of the tilting operation control is set and the counter representative of the time, for which the vibration angle stays at the limit value until the completion of the shift to the tilting operation control, is cleared, the next operational control goes to the step S31 where the correction amount is calculated from the inputted vibration angle. The result calculated in the step S32 is outputted to the D/A converter 27. The above-described consecutive steps are the flowchart for the normal operational control.

The operational control flowchart of the tilting operation will now be described. In the step S33 subsequent to the flowchart branched from the tilting operation in accordance with the tilting operation determination flag, a time period for centering is set in accordance with the input from the centering time input member 57. In step S34, the control of the integrator 25 is performed using the period of time for centering as a parameter. Namely, the integrator 25 is controlled so that the output becomes the reference condition after the elapse of the period of time for centering, as a result of which the angle signal in the pitch direction outputted from the integrator 25 is attenuated to the reference condition, i.e., zero. In the next step S35, the input vibration angle and the reference position (centering position) are compared with each other. If the input vibration angle reaches the reference position, in step S36, in order to finish the tilting operation control, the output of the analog switch 22 is switched to the high pass filter 23. Furthermore, the control of the integrator 25 is finished, and in step S37, the tilting operation determination flag is cleared up. Then, the correction amount is calculated from the input vibration angle in step S31. The result calculated in step S32 is outputted to the D/A converter 27. Unless the input vibration angle reaches the reference position, in order to continue the tilting operation control in the next cycle, the operation directly goes from the step S35 to step S31 so that the tilting operation determination flag is not cleared up. The correction amount is calculated from the input vibration angle. The result calculated is outputted to the D/A converter 27. The control flowchart in the case where the blur image correction in the pitch direction is allowed has been described.

Second Embodiment

In the first embodiment, in the panning operation control or in the tilting operation control, the control of the integrator 7, 25 is changed so that the time until the output becomes the reference condition is controlled. However, the same effect as that of the first embodiment may be obtained by the following method. The integrator 7, 25 is set to become the reference condition for a minimum period of time. A new low pass filter of software by the microcomputer 9 is provided. The interrupt frequency of the low pass filter may be changed by setting the centering time input member 57. The reference position signal is given to the input of this low pass filter to perform the calculation of the low pas filter of software. The calculation result is regarded as an angle signal to perform the correction amount calculation.

Figure 7:
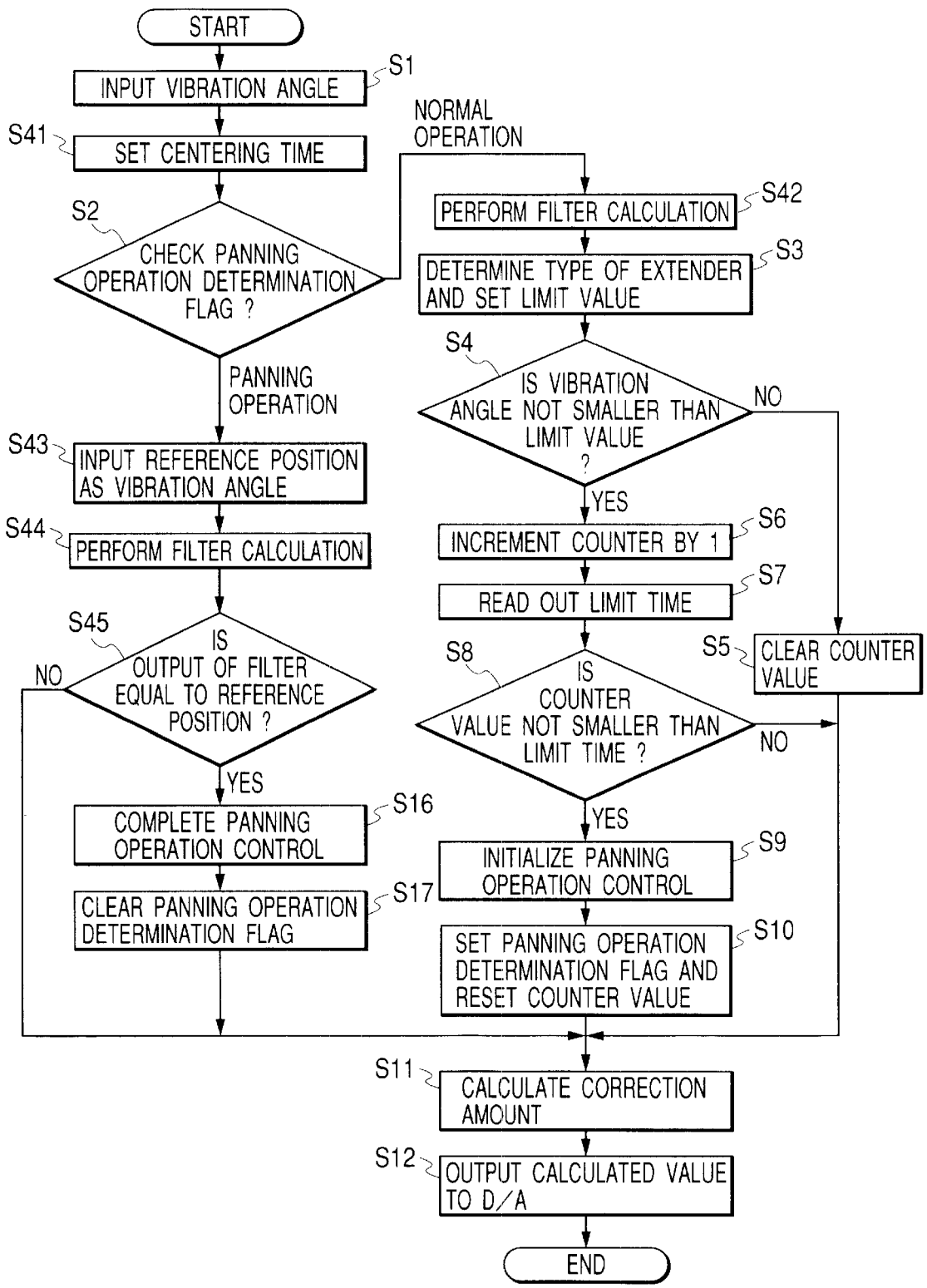
FIG. 7 is a flowchart showing the operation control in the yaw direction in accordance with a second embodiment of the present invention.

If the above-described context is given in the form of the flowchart, it is shown in FIG. 7. FIG. 7 shows the flowchart in the yaw direction but the flowchart in the pitch direction is similar thereto. FIG. 7 is different from FIG. 4 in steps S41 to S45.

The microcomputer 9 performs the process shown in the flowchart for every constant interval. In the process of the vibration angle input of the first step S1, the data into which the output of the integrator 7 is converted by the A/D converter 8 is inputted. In step S41, the interrupt frequency of the low pass filter composed of software is determined in accordance with the input from the centering time input member 57. In the case where the interrupt frequency is low, the centering time period is long. If the interrupt frequency is high, the centering time period is short. In step S2, the determination is conducted in accordance with the flag as to whether the panning operation control should be executed or the normal operation control should be executed, and the operation goes to the respective control steps. In the normal operation control, in step S42, the vibration angle is filter calculated by the low pass filter of the software. This calculation is conducted in order to keep the continuity of the values of the filter. In the normal operation control, the output of the filter calculation is not used. In step S3, the position of the extender is picked up, the kind (conversion magnification) of the extender currently inserted into the image taking optical axis is determined and the limit value for the vibration angle at which the operational mode goes to the panning operation control is suitably set according to the kind of the extender. For example, in the case where the extender having the conversion magnification k is inserted into the image taking optical axis, the limit value is set at 1/k.

Furthermore, in step S4, the magnitude of the vibration angle inputted and the limit value of the vibration angle set are compared with each other. If the vibration angle is smaller than the limit value, since it is unnecessary to shift the operational mode to the panning operation control, the counter representative of the period of time for which the vibration angle stays at the limit value is cleared up. Thereafter, in step S11, the data table of FIG. 2 is used to calculate the correction amount from the inputted vibration angle. The result calculated in the step S12 is outputted to the D/A converter 10.

On the other hand, in the case where the vibration angle exceeds the limit value, the counter representative of the period of time for which the vibration angle stays beyond the limit value is incremented by +1 in step S6. The limit time is read out and set in step S7. In step S8, the set limit time and the counter value are compared with each other. If the counter value does not reach the limit time, at the present it is determined that it is unnecessary to shift the operational mode to the panning operation control. The correction amount is calculated from the input vibration angle in step S11. The result calculated in the step S12 is outputted to the D/A converter 10.

In the case where the counter value exceeds the limit time, in step S9, since the operational mode shifts to the panning operation control, the output of the analog switch 4 is switched to the high pass filter 6, and at the same time, the control is effected so that the output of the integrator 7 comes to the reference condition. In step S10, after the flag for determination of the performance of the panning operation control is set and the counter representative of the time for which the vibration angle stays beyond the limit value is cleared, the correction amount is calculated from the vibration angle inputted in step S11. The result calculated in the step S12 is outputted to the D/A converter 10. The above-described consecutive steps are the flowchart for the normal operational control.

The operational control flowchart of the panning operation will now be described. In the step S43 subsequent to the flowchart branched from the panning operation in accordance with the banning operation determination flag, the value of the vibration angle to be inputted into the low pass filter composed of software is made a value representative of the reference position, and the filter calculation is performed. The output value of this low pass filter of t he software is gradually attenuated and finally reaches the reference position. This attenuation time is controlled so as to be identified with the set centering time. In the next step S45, the comparison of the output value of the low pass filter of the software with the reference value is conducted. In step S16, if the input vibration angle reaches the reference position, in order to finish the panning operation control, the output of the analog switch 4 is switched to the high pass filter 5. Furthermore, the control of the integrator 7 is set to be ready for normal operation. In step S17, the panning operation determination flag is cleared up. Furthermore, the calculation of the correction amount is performed using as the input signal the output value of the low pass filter of software calculated in step S11. In step S12, the result calculated is outputted to the D/A converter 10. Unless the input vibration angle reaches the reference position, the operation goes from the step S45 directly to step S12 so that the panning operation determination flag is not cleared up in order to keep the continuity of the panning control operation in the next operation. The calculation of the correction amount is performed using as the input signal the output value of the low pass filter of software calculated. The result calculated in step S12 is outputted to the D/A converter 10.

Third Embodiment

In the flowcharts shown in FIGS. 4, 6 and 7, it is necessary to determine whether the vibration angle outputted from the integrator 7, 25 is not less than the limit value and the counter value is not less than the limit time, i.e., whether the period of time when the vibration angle is within the limit value is longer than a predetermined period of time so as to meet the condition that the image blur correcting optical system 17 is shifted to the reference position including and in the vicinity of the image taking optical axis. However, it is possible to solely set the condition that the vibration angle outputted from the integrator 7, 25 be not less than the limit value.

Incidentally, the data table shown in FIGS. 3 and 5 may be stored on the side of the video camera 51.

Also, the zoom operation member 38, the focus operation member 42, the vibration preventing selection switch 49, the limit value stay time input member 56 and the centering time input member 57 may be disposed on the side of the video camera 51.

As described above, according to the present embodiment, the limit value of the detection signal of the vibration for shifting the image blur correcting optical system to the reference position including and in the vicinity of the image taking optical axis is changed in accordance with the absence or presence and/or the conversion magnification of the focal length converting optical system whereby upon panning or tilting, the strange feeling to the cameraman caused due to the difference of the conversion magnification of the focal length converting optical system may be suppressed.

Also, the limit shift amount of the detection signal of the shift amount of the image blur correcting optical system set for shifting the image blur correcting optical system to the reference position including and in the vicinity of the image taking optical axis is changed in accordance with the absence or presence and/or the conversion magnification of the focal length converting optical system to be inserted in the image taking optical axis whereby upon panning or tilting, the strange feeling to the cameraman caused due to the difference of the conversion magnification of the focal length converting optical system may be suppressed.

Furthermore, for example, if the condition for shifting the image blur correcting optical system to the reference position is made to be that the detection signal of the vibration stays for a predetermined time period beyond the limit value, whereby the panning or tilting may be detected without fail.

What is claimed is:
1. A lens system comprising:
a) an image taking optical unit having an optical axis;
b) a correction optical component for tilting the optical axis of said image taking optical unit;
c) a conversion optical component insertable into or retractable from the optical axis of said image taking optical unit, said conversion optical component having an optical element for converting a focal length;
d) a vibration sensor for detecting a vibration;
e) a magnification detection sensor for detecting a conversion magnification of said optical element when said optical element of said conversion optical component is disposed on the optical axis of said image taking optical unit;
f) a driver for driving said correction optical component to tilt the optical axis of said image taking optical unit; and
g) a controller for controlling the drive of said correction optical component by said driver in accordance with the detection output from said vibration sensor, wherein:
when the detection output from said vibration sensor exceeds a predetermined limit value, said controller controls the drive of said driver so that said correction optical component is located in the vicinity of the optical axis; and
said controller changes the limit value in correspondence with the output from said magnification detection sensor.

2. A lens system according to claim 1, wherein:
said conversion optical component has a first optical element having a focal length conversion magnification of one time and a second optical element having a magnification that is different from the conversion magnification of said first optical element; and
said controller keeps the limit value unchanged when the output from said magnification detection sensor is an output representative of the conversion magnification of said first optical element, and changes the limit value when the output from said magnification detection sensor is an output representative of the conversion magnification of said second optical element.

3. A lens system according to claim 1, wherein:
said conversion optical component has a first optical element having a focal length conversion magnification of one time and a second optical element having a magnification that is larger than the conversion magnification of said first optical element; and
said controller keeps the limit value unchanged when the output from said magnification detection sensor is an output representative of the conversion magnification of said first optical element, and changes the limit value to be smaller than the original value when the output from said magnification detection sensor is an output representative of the conversion magnification of said second optical element.

4. A lens system comprising:
a) an image taking optical unit having an optical axis;
b) a correction optical component for tilting the optical axis of said image taking optical unit;
c) a conversion optical component insertable into or retractable from the optical axis of said image taking optical unit;
d) a vibration sensor for detecting a vibration;
e) an insertion or retraction detection sensor for detecting whether said conversion optical component is disposed on the optical axis of said image taking optical unit or not;
f) a driver for driving said correction optical component to tilt the optical axis of said image taking optical unit; and g) a controller for controlling the drive of said correction optical component by said driver in accordance with the detection output from said vibration sensor, wherein:

when the detection output from said vibration sensor exceeds a predetermined limit value, said controller controls the drive of said driver so that said correction optical component is located in the vicinity of the optical axis; and said controller changes the limit value in correspondence with the output from said insertion or retraction detection sensor.

5. A lens system according to claim 4, wherein said controller keeps the limit value unchanged when the output from said insertion or retraction sensor is an output representative of a condition that said conversion optical component is "not presented" on the optical axis and changes the limit value when the output from said insertion or retraction sensor is an output representative of a condition that said conversion optical component is "presented" on the optical axis.

6. A lens system comprising:
a) an image taking optical unit having an optical axis;
b) a correction optical component for tilting the optical axis of said image taking optical unit;
c) a conversion optical component insertable into or retractable from the optical axis of said image taking optical unit, said conversion optical component having an optical element for converting a focal length;
d) a vibration sensor for detecting a vibration;
e) a magnification detection sensor for detecting a conversion magnification of said optical element when said optical element of said conversion optical component is disposed on the optical axis of said image taking optical unit;
f) a driver for driving said correction optical component to tilt the optical axis of said image taking optical unit; and
g) a controller for controlling the drive of said correction optical component by said driver in accordance with the detection output from said vibration sensor, wherein:

when the detection output from said vibration sensor exceeds a predetermined limit value and the output exceeding the limit value is continued beyond a predetermined period of time, said controller controls the drive of said driver so that said correction optical component is located in the vicinity of the optical axis; and said controller changes the limit value in correspondence with the output from said magnification detection sensor.

7. A lens system comprising:
a) an image taking optical unit having an optical axis;
b) a correction optical component for tilting the optical axis of said image taking optical unit;
c) a conversion optical component insertable into or retractable from the optical axis of said image taking optical unit;
d) a vibration sensor for detecting a vibration;
e) an insertion or retraction detection sensor for detecting whether said conversion optical component is disposed on the optical axis of said image taking optical unit or not;
f) a driver for driving said correction optical component to tilt the optical axis of said image taking optical unit; and g) a controller for controlling the drive of said correction optical component by said driver in accordance with the detection output from said vibration sensor, wherein:

when the detection output from said vibration sensor exceeds a predetermined limit value and the output exceeding the limit value is continued beyond a predetermined period of time, said controller controls the drive of said driver so that said correction optical component is located in the vicinity of the optical axis; and said controller changes the limit value in correspondence with the output from said insertion or retraction detection sensor.

8. A lens system comprising:
a) an image taking optical unit having an optical axis;
b) a correction optical component for tilting the optical axis of said image taking optical unit;
c) a shift sensor for detecting a shift amount of said correction optical component;
d) a conversion optical component insertable into or retractable from the optical axis of said image taking optical unit, said conversion optical component having an optical element for converting a focal length;
e) a vibration sensor for detecting a vibration;
f) a magnification detection sensor for detecting a conversion magnification of said optical element when said optical element of said conversion optical component is disposed on the optical axis of said image taking optical unit;
g) a driver for driving said correction optical component to tilt the optical axis of said image taking optical unit; and
h) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said magnification detection sensor.

9. A lens system comprising:
a) an image taking optical unit having an optical axis;
b) a correction optical component for tilting the optical axis of said image taking optical unit;
c) a shift sensor for detecting a shift amount of said correction optical component;
d) a conversion optical component insertable into or retractable from the optical axis of said image taking optical unit;
e) a vibration sensor for detecting a vibration;
f) an insertion or retraction detection sensor for detecting whether said conversion optical component is disposed on the optical axis of said image taking optical unit or not;
g) a driver for driving said correction optical component to tilt the optical axis of said image taking optical unit; and
h) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said insertion or retraction detection sensor.

10. A lens system comprising:
 a) an image taking optical unit having an optical axis;
 b) a magnification changing optical component moved along the optical axis of said image taking optical unit for changing a magnification ratio;
 c) a position sensor for detecting the movement position of said magnification changing optical component on the optical axis;
 d) a correction optical component for tilting the optical axis of said image taking optical unit;
 e) a shift sensor for detecting a shift amount of said correction optical component;
 f) a conversion optical component insertable into or retractable from the optical axis of said image taking optical unit, said conversion optical component having an optical element for converting a focal length;
 g) a vibration sensor for detecting a vibration;
 h) a magnification detection sensor for detecting a conversion magnification of said optical element when said optical element of said conversion optical component is disposed on the optical axis of said image taking optical unit;
 i) a driver for driving said correction optical component to tilt the optical axis of said image taking optical unit; and
 j) a controller for controlling the drive of said correction optical component by said driver in accordance with the detection output from said vibration sensor, wherein:
  when the detection output from said shift sensor exceeds a predetermined limit value of the shift amount, said controller controls the drive of said driver so that said correction optical component is located in the vicinity of the optical axis; and
  said controller changes the limit value of the shift amount in correspondence with the output from said magnification detection sensor.

11. A lens system comprising:
 a) an image taking optical unit having an optical axis;
 b) a magnification changing optical component moved along the optical axis of said image taking optical unit for changing a magnification ratio;
 c) a position sensor for detecting the movement position of said magnification changing optical component on the optical axis;
 d) a correction optical component for tilting the optical axis of said image taking optical unit;
 e) a shift sensor for detecting a shift amount of said correction optical component;
 f) a conversion optical component insertable into or retractable from the optical axis of said image taking optical unit;
 g) a vibration sensor for detecting a vibration;
 h) an insertion or retraction detection sensor for detecting whether said magnification changing optical component is disposed on the optical axis of said image taking optical unit or not;
 i) a driver for driving said correction optical component to tilt the optical axis of said image taking optical unit; and
 j) a controller for controlling the drive of said correction optical component by said driver in accordance with the detection output from said vibration sensor, wherein:
  when the detection output from said shift sensor exceeds a predetermined limit value of the shift amount, said controller controls the drive of said driver so that said correction optical component is located in the vicinity of the optical axis; and
  said controller changes the limit value of the shift amount in correspondence with the output from said insertion or retraction detection sensor and the output from said position sensor.

12. A camera system having a camera mounted with a lens system comprising:
 a) an image taking optical unit having an optical axis;
 b) a correction optical component for tilting the optical axis of said image taking optical unit;
 c) a conversion optical component insertable into or retractable from the optical axis of said image taking optical unit, said conversion optical component having an optical element for converting a focal length;
 d) a vibration sensor for detecting a vibration;
 e) a magnification detection sensor for detecting a conversion magnification of said optical element when said optical element of said conversion optical component is disposed on the optical axis of said image taking optical unit;
 f) a driver for driving said correction optical component to tilt the optical axis of said image taking optical unit; and
 g) a controller for controlling the drive of said correction optical component by said driver in accordance with the detection output from said vibration sensor, wherein:
  when the detection output from said vibration sensor exceeds a predetermined limit value, said controller controls the drive of said driver so that said correction optical component is located in the vicinity of the optical axis; and
  said controller changes the limit value in correspondence with the output from said magnification detection sensor.

13. A camera system having a camera mounted with a lens system as claimed in claim 1, wherein:
 said conversion optical component has a first optical element having a focal length conversion magnification of one time and a second optical element having a magnification that is different from the conversion magnification of said first optical element; and
 said controller keeps the limit value unchanged when the output from said magnification detection sensor is an output representative of the conversion magnification of said first optical element, and changes the limit value when the output from said magnification detection sensor is an output representative of the conversion magnification of said second optical element.

14. A camera system having a camera mounted with a lens system as claimed in claim 1, wherein:
 said conversion optical component has a first optical element having a focal length conversion magnification of one time and a second optical element having a magnification that is larger than the conversion magnification of said first optical element; and said controller keeps the limit value unchanged when the output from said magnification detection sensor is an output representative of the conversion magnification of said first optical element, and changes the limit value to be smaller than the original value when the output from said magnification detection sensor is an output representative of the conversion magnification of said second optical element.

15. A camera system having a camera mounted with a lens system comprising:

a) an image taking optical unit having an optical axis;
b) a correction optical component for tilting the optical axis of said image taking optical unit;
c) a conversion optical component insertable into or retractable from the optical axis of said image taking optical unit;
d) a vibration sensor for detecting a vibration;
e) an insertion or retraction detection sensor for detecting whether said conversion optical component is disposed on the optical axis of said image taking optical unit or not;
f) a driver for driving said correction optical component to tilt the optical axis of said image taking optical unit; and
g) a controller for controlling the drive of said correction optical component by said driver in accordance with the detection output from said vibration sensor, wherein:

when the detection output from said vibration sensor exceeds a predetermined limit value, said controller controls the drive of said driver so that said correction optical component is located in the vicinity of the optical axis; and said controller changes the limit value in correspondence with the output from said insertion or retraction detection sensor.

16. A camera system having a camera mounted with a lens system as claimed in claim 4, wherein said controller keeps the limit value unchanged when the output from said insertion or retraction sensor is an output representative of a condition that said conversion optical component is "not presented" on the optical axis and changes the limit value when the output from said insertion or retraction sensor is an output representative of a condition that said conversion optical component is "presented" on the optical axis.

17. A camera system having a camera mounted with a lens system comprising:

a) an image taking optical unit having an optical axis;
b) a correction optical component for tilting the optical axis of said image taking optical unit;
c) a conversion optical component insertable into or retractable from the optical axis of said image taking optical unit, said conversion optical component having an optical element for converting a focal length;
d) a vibration sensor for detecting a vibration;
e) a magnification detection sensor for detecting a conversion magnification of said optical element when said optical element of said conversion optical component is disposed on the optical axis of said image taking optical unit;
f) a driver for driving said correction optical component to tilt the optical axis of said image taking optical unit; and g) a controller for controlling the drive of said correction optical component by said driver in accordance with the detection output from said vibration sensor, wherein:

when the detection output from said vibration sensor exceeds a predetermined limit value and the output exceeding the limit value is continued beyond a predetermined period of time, said controller controls the drive of said driver so that said correction optical component is located in the vicinity of the optical axis; and said controller changes the limit value in correspondence with the output from said magnification detection sensor.

18. A camera system having a camera mounted with a lens system comprising:

a) an image taking optical unit having an optical axis;
b) a correction optical component for tilting the optical axis of said image taking optical unit;
c) a conversion optical component insertable into or retractable from the optical axis of said image taking optical unit;
d) a vibration sensor for detecting a vibration;
e) an insertion or retraction detection sensor for detecting whether said conversion optical component is disposed on the optical axis of said image taking optical unit or not;
f) a driver for driving said correction optical component to tilt the optical axis of said image taking optical unit; and
g) a controller for controlling the drive of said correction optical component by said driver in accordance with the detection output from said vibration sensor, wherein:

when the detection output from said vibration sensor exceeds a predetermined limit value and the output exceeding the limit value is continued beyond a predetermined period of time, said controller controls the drive of said driver so that said correction optical component is located in the vicinity of the optical axis; and said controller changes the limit value in correspondence with the output from said insertion or retraction detection sensor.

19. A camera system having a camera mounted with a lens system comprising:

a) an image taking optical unit having an optical axis;
b) a correction optical component for tilting the optical axis of said image taking optical unit;
c) a shift sensor for detecting a shift amount of said correction optical component;
d) a conversion optical component insertable into or retractable from the optical axis of said image taking optical unit, said conversion optical component having an optical element for converting a focal length;
e) a vibration sensor for detecting a vibration;
f) a magnification detection sensor for detecting a conversion magnification of said optical element when said optical element of said conversion optical component is disposed on the optical axis of said image taking optical unit;
g) a driver for driving said correction optical component to tilt the optical axis of said image taking optical unit; and
h) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said magnification detection sensor.

20. A camera system having a camera mounted with a lens system comprising:

a) an image taking optical unit having an optical axis;

b) a correction optical component for tilting the optical axis of said image taking optical unit;

c) a shift sensor for detecting a shift amount of said correction optical component;

d) a conversion optical component insertable into or retractable from the optical axis of said image taking optical unit;

e) a vibration sensor for detecting a vibration;

f) an insertion or retraction detection sensor for detecting whether said conversion optical component is disposed on the optical axis of said image taking optical unit or not;

g) a driver for driving said correction optical component to tilt the optical axis of said image taking optical unit; and h) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said insertion or retraction detection sensor.

21. A camera system having a camera mounted with a lens system comprising:

a) an image taking optical unit having an optical axis;

b) a magnification changing optical component moved along the optical axis of said image taking optical unit for changing a magnification ratio;

c) a position sensor for detecting the movement position of said magnification changing optical component on the optical axis;

d) a correction optical component for tilting the optical axis of said image taking optical unit;

e) a shift sensor for detecting a shift amount of said correction optical component;

f) a conversion optical component insertable into or retractable from the optical axis of said image taking optical unit, said conversion optical component having an optical element for converting a focal length;

g) a vibration sensor for detecting a vibration;

h) a magnification detection sensor for detecting a conversion magnification of said optical element when said optical element of said conversion optical component is disposed on the optical axis of said image taking optical unit;

i) a driver for driving said correction optical component to tilt the optical axis of said image taking optical unit; and j) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said magnification detection sensor.

22. A camera system having a camera mounted with a lens system comprising:

a) an image taking optical unit having an optical axis;

b) a magnification changing optical component moved along the optical axis of said image taking optical unit for changing a magnification ratio;

c) a position sensor for detecting the movement position of said magnification changing optical component on the optical axis;

d) a correction optical component for tilting the optical axis of said image taking optical unit;

e) a shift sensor for detecting a shift amount of said correction optical component;

f) a conversion optical component insertable into or retractable from the optical axis of said image taking optical unit;

g) a vibration sensor for detecting a vibration;

h) an insertion or retraction detection sensor for detecting whether said magnification changing optical component is disposed on the optical axis of said image taking optical unit or not;

i) a driver for driving said correction optical component to tilt the optical axis of said image taking optical unit; and j) a controller for controlling the drive of said correction optical component by said driver in accordance with the detection output from said vibration sensor, wherein:

when the detection output from said shift sensor exceeds a predetermined limit value of the shift amount, said controller controls the drive of said driver so that said correction optical component is located in the vicinity of the optical axis; and said controller changes the limit value of the shift amount in correspondence with the output from said insertion or retraction detection sensor and the output from said position sensor.

* * * * *

UNITED STATES PATENT AND TRADEMARK OFFICE
CERTIFICATE OF CORRECTION

PATENT NO. : 6,473,566 B2
DATED : October 29, 2002
INVENTOR(S) : Kasuya

It is certified that error appears in the above-identified patent and that said Letters Patent is hereby corrected as shown below:

Column 3,
Line 5, delete "th e" and insert therefor -- the --

Column 6,
Line 29, delete "zero.)" and insert therefor -- zero) --

Column 7,
Line 38, delete "AOO to AOn" and insert therefor -- A00 to A0n --

Column 10,
Line 13, delete "Is" and insert therefor -- is --

Column 14,
Line 25, delete "21" and insert therefor -- S21 --

Column 15,
Line 45, delete "pas" and insert therefor -- pass --

Column 16,
Line 57, delete "t he" and insert therefor -- the --

Signed and Sealed this

Twelfth Day of August, 2003

JAMES E. ROGAN
*Director of the United States Patent and Trademark Office*